US011372409B2

(12) United States Patent
Freitas et al.

(10) Patent No.: US 11,372,409 B2
(45) Date of Patent: Jun. 28, 2022

(54) MULTI-TERRAIN INSPECTION ROBOTIC DEVICE AND METHODS FOR CONFIGURING AND GUIDING THE SAME

(71) Applicants: VALE S.A., Rio de Janeiro (BR); Serviço Nacional de Aprendizagem Industrial, Departamento Regional da Bahia, Salvador (BR)

(72) Inventors: Gustavo Medeiros Freitas, Ouro Preto (BR); Filipe Augusto Santos Rocha, Ouro Preto (BR); Marcos Paulo Torre, Mariana (BR); Angelo Frederico Fontes Junior, Ouro Preto (BR); Victória Regina Ramos, Cachoeira Do Campo (BR); Luiz Eduardo Da Costa Nogueira, Ouro Preto (BR); Alexandre Souza Santos, Mariana (BR); Eduardo Cota, Ouro Preto (BR); Wilson Miola, Ouro Preto (BR); Marco Antonio Dos Reis, Camaçari (BR); Branilson Luiz Santos Costa, Lauro De Freitas (BR); Luis Carlos Moreno Ledezma, Salvador (BR); Ronaldo Pereira Evangelista, Lauro De Freitas (BR); Pedro Xavier Alcantara, Salvador (BR); Rebeca Tourinho Lima, Salvador (BR); Tiago Pereira De Souza, Salvador (BR); Iuri Viana Brandi, Belo Horizonte (BR); Ramon Nunes Araújo, Contagem (BR); Márcio Fernando Mansur Gomes, Belo Horizonte (BR); Gabriel Carvalho Garcia, Ouro Preto (BR); Héctor Azpúrua, Belo Horizonte (BR)

(73) Assignees: VALE S.A., Rio de Janeiro (BR); Serviço Nacional de Aprendizagem Industrial, Departamento Regional da Bahia, Salvador (BR)

(*) Notice: Subject to any disclaimer, the term of this patent is extended or adjusted under 35 U.S.C. 154(b) by 324 days.

(21) Appl. No.: 16/485,397

(22) PCT Filed: Feb. 9, 2018

(86) PCT No.: PCT/BR2018/050025
§ 371 (c)(1),
(2) Date: Aug. 12, 2019

(87) PCT Pub. No.: WO2018/145183
PCT Pub. Date: Aug. 16, 2018

(65) Prior Publication Data
US 2019/0377346 A1    Dec. 12, 2019

Related U.S. Application Data

(60) Provisional application No. 62/458,463, filed on Feb. 13, 2017, provisional application No. 62/458,311, filed on Feb. 13, 2017.

(51) Int. Cl.
*G05D 1/00* (2006.01)
*B62D 55/06* (2006.01)
(Continued)

(52) U.S. Cl.
CPC ........... *G05D 1/0094* (2013.01); *B62D 55/06* (2013.01); *B62D 57/032* (2013.01);
(Continued)

(58) Field of Classification Search
USPC .............. 700/245–264; 701/23–28, 245–264
See application file for complete search history.

(56) References Cited

U.S. PATENT DOCUMENTS

| 5,999,865 A | * | 12/1999 | Bloomquist | ......... G05D 1/0248 |
| | | | | 701/25 |
| 6,006,847 A | * | 12/1999 | Knight | ................... B62D 55/04 |
| | | | | 180/9.26 |

(Continued)

FOREIGN PATENT DOCUMENTS

| | | |
|---|---|---|
| AU | 2016205004 A1 | 8/2016 |
| CA | 3049695 A1 * | 8/2018 .......... B62D 57/028 |
| TW | 201114667 A | 5/2011 |

OTHER PUBLICATIONS

International Search Report issued in International Application No. PCT/BR2018/050025 dated Apr. 24, 2018.

(Continued)

*Primary Examiner* — Jonathan L Sample
(74) *Attorney, Agent, or Firm* — ArentFox Schiff

(57) ABSTRACT

This disclosure presents a robotic device for multi-terrain inspection, composed by a robot body, a quick reconfigurable locomotion module and a mapping unit capable to model the inspected environment through a 3D colored point cloud. The robot has different locomotion mechanisms that can be quickly replaced, thereby changing the robot mobility characteristics. The device is controlled through teleoperation or autonomously. When in teleoperated mode, an operating assist module provides relevant locomotion information to the operator including a map that shows areas where the robot may not transpose or tip-over. This module also suggests to the operator other locomotion configurations to overcome obstacles presented in the map. When in autonomous mode, the navigation module provides a strategy to explore unknown environments and trace optimal locomotion path considering the traveled distance, tipping-over risk and energy consumption. Regarding the invention characteristics described above, the main objective is to perform inspections of confined and risk areas, i.e., caves, sewer and dam spillway galleries, and areas with risk of collapse.

22 Claims, 16 Drawing Sheets

(51) Int. Cl.
  *B62D 57/032* (2006.01)
  *G05D 1/02* (2020.01)
(52) U.S. Cl.
  CPC ......... *G05D 1/0214* (2013.01); *G05D 1/0274* (2013.01); *G05D 1/0088* (2013.01); *G05D 2201/0207* (2013.01)

(56) References Cited

U.S. PATENT DOCUMENTS

| | | | |
|---|---|---|---|
| 6,349,249 B1 * | 2/2002 | Cunningham | E21D 9/004 701/25 |
| 7,017,687 B1 * | 3/2006 | Jacobsen | B62D 57/028 280/5.2 |
| 7,069,124 B1 * | 6/2006 | Whittaker | G05D 1/0274 701/28 |
| 7,926,598 B2 * | 4/2011 | Rudakevych | B62D 55/075 180/8.1 |
| 8,106,616 B1 * | 1/2012 | Theobald | B25J 5/005 318/568.22 |
| 9,283,674 B2 * | 3/2016 | Hoffman | B25J 19/021 |
| 9,373,149 B2 * | 6/2016 | Abhyanker | G05D 1/0238 |
| 9,789,607 B1 * | 10/2017 | Whitman | B25J 13/006 |
| 9,989,967 B2 * | 6/2018 | Jacobus | G05D 1/024 |
| 10,059,004 B2 * | 8/2018 | Inaba | B25J 5/00 |
| 10,578,447 B2 * | 3/2020 | Sullivan | G01C 21/3461 |
| 2007/0240917 A1 * | 10/2007 | Duceppe | B62D 55/112 180/9.21 |
| 2008/0027590 A1 * | 1/2008 | Phillips | G05D 1/0088 701/2 |
| 2008/0027591 A1 * | 1/2008 | Lenser | G05D 1/0297 701/28 |
| 2008/0105481 A1 * | 5/2008 | Hutcheson | B60L 15/20 180/209 |
| 2009/0076674 A1 * | 3/2009 | Kiegerl | E02F 9/264 701/2 |
| 2009/0281661 A1 * | 11/2009 | Dooley | B60L 15/2036 901/1 |
| 2011/0054689 A1 * | 3/2011 | Nielsen | G05D 1/0088 700/258 |
| 2011/0106339 A1 * | 5/2011 | Phillips | G05D 1/0033 701/2 |
| 2011/0162896 A1 * | 7/2011 | Gillett | F03D 9/25 180/2.2 |
| 2011/0260527 A1 * | 10/2011 | Bessette | B62D 55/14 305/165 |
| 2012/0239191 A1 * | 9/2012 | Versteeg | F41H 11/13 901/1 |
| 2012/0281503 A1 * | 11/2012 | Rikoski | G01S 7/52003 367/88 |
| 2012/0286565 A1 * | 11/2012 | Marchildon | B62D 55/04 305/132 |
| 2015/0253775 A1 * | 9/2015 | Jacobus | G05D 1/024 701/23 |
| 2015/0291234 A1 * | 10/2015 | Zuchoski | B62D 55/02 180/9.62 |
| 2015/0329154 A1 * | 11/2015 | Roy | B62D 55/10 305/142 |
| 2016/0075384 A1 * | 3/2016 | Mattson | B62D 55/286 305/131 |
| 2016/0157414 A1 * | 6/2016 | Ackerman | G05D 1/0225 701/25 |
| 2016/0325793 A1 * | 11/2016 | Zuidberg | B62D 55/04 |
| 2017/0199525 A1 * | 7/2017 | Albaghajati | G05D 1/0274 |
| 2018/0043947 A1 * | 2/2018 | Brazier | B62D 55/04 |
| 2018/0299278 A1 * | 10/2018 | Sullivan | G01C 21/32 |
| 2019/0377346 A1 * | 12/2019 | Freitas | B62D 57/022 |

OTHER PUBLICATIONS

Lars Henriksen and Eric Krotkov, "Natural Terrain Hazard Detection with a Laser Rangefinder", (1997), Proceedings of the 1997 IEFE International Conference on Robotics and Automation.

Siles, Ivan, "Design, Construction, and Testing of a New Class of Mobile Robots" (2009). All Theses. Paper 559.

* cited by examiner

MULTI-TERRAIN INSPECTION ROBOTIC DEVICE AND METHODS FOR CONFIGURING AND GUIDING THE SAME

CROSS REFERENCE TO RELATED APPLICATIONS

This application is a 35 U.S.C. § 371 National Phase of PCT Application No. PCT/BR2018/050025 filed Feb. 9, 2018, entitled "MULTI-TERRAIN INSPECTION ROBOTIC DEVICE AND METHODS FOR CONFIGURING AND GUIDING THE SAME," which claims benefit to U.S. Provisional Application No. 62/458,463 filed Feb. 13, 2017 and U.S. Provisional Application 62/458,311 filed Feb. 13, 2017. The disclosure of these prior applications are hereby incorporated by reference herein in their entirety

FIELD OF THE INVENTION

The present invention addresses a robotic device capable to inspect confined and risk areas. The robot applies a reconfigurable locomotion module in order to operate in irregular and rough terrains, carrying a mapping unit capable to model the covered terrain as a 3D colored point cloud. The terrain model works as an input of an operating assist module that indicates non-transposable and tipping-over risk areas and suggests adequate locomotion configurations to transpose each obstacle. An autonomous navigation module also uses the terrain model to generate optimal paths considering the traveled distance, tipping-over risk, and energy consumption.

BACKGROUND OF THE INVENTION

Natural caves are commonly found in iron formation areas. In order to economically explore such areas, an inspection of the caves is environmentally and legally required. Considering this scenario, an inner investigation is crucial to evaluate the cave's relevance and consequently to determine its preservation or exploitation. Speleologist groups are normally gathered to perform those studies. However, natural caves may be hazardous environments due to the presence of venomous animals, noxious gases, bat excrement, risk of roof collapse, among others. The presence of humans in such areas is always related with health hazard. Taking that into account, the use of robotic devices to enter the caves and perform these inspections can be an adequate technical solution.

From the robotics point of view, natural caves can be extremely challenging. They may present characteristics such as: irregular terrain; closed environments; wireless communication difficulty; non-presence of GPS signal. A special challenge lays on the topography, which is commonly complex. The terrains are not structured, presenting a mix of flat and rugged areas. Considering such characteristics, the exploring device must have an efficient locomotion system, allying obstacle transposing without tipping-over, energy efficiency and payload capabilities.

The exploring device must have energy autonomy to entry the cave, perform the inspection in all of inner sectors and return to the operational base. That way, to have a locomotion configuration that is energy consumption friendly, such as wheels, is an effective solution. On the other hand, when compared to legs, wheels are less efficient to transpose obstacles. A locomotion configuration based on legs is more effectively on rough terrain transposing, although it consumes extra energy.

Another problem related to cave's inspection is the robot's stability. Stability here refers to the capability of the device to maintain itself upward by its own means, without tipping-over. To perform special inspections and 3D mapping, extra sensors must be embedded in the device, adding payload to the system. Usually, the hardware is sensible and should not suffer mechanical impacts, which eventually happens in a rollover event. Regarding that, it is empirical to maintain the device's stability during all the inspection.

Although it is common to find robotic devices projected to perform environmental inspections, only a few of them are specially designed for natural cave inspection. Some authors claim that robots designed for underground mines inspections fit for the job, but comparing the conditions of this kind of environment with natural caves, the second one requires very different mobility capabilities.

Specifically, for underground mines inspection, researches at Carnegie Mellon University proposed the development of the Groundhog robot. It weighs 700 kg, measures 1 m in height, 1.2 m in width and is able to map underground mines in teleoperated or autonomous modes. However, its large dimensions make it not suitable for natural caves inspection. The robotic device can get stuck in a confined area or damage the ambiance fragile structure.

Still on Carnegie Mellon University, the U.S. Pat. No. 7,069,124 describes a robotic method for void mapping. The authors disclosure two robots that are chosen for a specific mission depending mainly on the void entrance, leaving in the background the terrain structure conditions. This is a plausible approach since underground mines commonly have a structured terrain, rarely presenting obstacles on the way or extreme rough terrains. As the authors claim, the robots can move over flat and half-rugged terrains, being able to overcome some obstacles; however, rougher terrains are non-transposable and the strategy to map those areas is to install the sensors at the device's robotic arm, and stretch the arm until its workspace frontier.

The Counter Tunnel Exploitation Robot (CTER), developed by the SPAWAR Systems Center Pacific, is a small robot designed to inspect smuggling tunnels. It has small size and uses a locomotion configuration based on steer tracks. Its body is long and flexible, allowing the device to pass through small spaces and holes in order to access the tunnels. Still, the CTER's design contemplates the ability to enter in confined areas with access restriction, rather than transposing rough terrain.

Designed specifically for natural caves inspection, the robot FREESE from SILES, I. and WALKER, I. D. has small dimensions, star-shaped locomotion mechanisms and is assembled on a flexible frame. Those characteristics guarantee great mobility in natural caves; however, it has small payload capability, not allowing it to carry extra sensors or other equipment to perform a full 3D colored mapping of the environment.

In comparison to the mobility solutions considered state of art, the invention proposed in this document solves several locomotion restrictions by providing a solution to quickly change the mobility characteristics of the inspection device, and evaluate the topographical map of the surroundings in order to indicate which locomotion configurations are able to transpose each part of the terrain.

Regarding devices for three dimensional (3D) mapping, most of commercial 3D laser scanners are stationary equipment set on tripods by specialists to perform sweeps where mapping is demanded. They used to be compound by laser sensors, mirror arrays, high definition (HD) cameras, global positioning system (GPS) and Inertial Measurement Unit (IMU). Thus, when scanning, point clouds and red-green-blue (RGB) imaging are collected to be associated with and post-processing on software to generate 3D colored maps.

Despite the equipment, there is a particular solution in 3D laser scanning named Zebedee, patented under AU2016205004 by CSIRO, in Australia. It consists of a two dimensional (2D) light imaging, detection, and ranging (LiDAR) and a MicroElectroMechanical System (MEMS) IMU mounted on a spring mechanism. As the operator moves through the intended environment, the scanner loosely oscillates about the spring producing a rotation that converts 2D measurements into 3D fields of view. Similar to the other solutions, it is necessary direct human interaction in order to provide results.

OBJECTS OF THE INVENTION

The object of the invention consists on a robotic device that is capable to inspect and map confined and risk areas, i.e., caves, sewer and dam spillway galleries, and areas with risk of collapse, being able to overcome unstructured terrains and model the surrounding environment through a 3D colored point cloud. The device counts on a reconfigurable locomotion module, which the specific configuration is defined based on the terrain model. The terrain model also provides information to indicate non-transposable and tipping-over risk areas, and to generate optimal paths considering traveled distance, tipping-over risk, and energy consumption.

DETAILED DESCRIPTION OF THE INVENTION

Natural caves have a very peculiar terrain topography. Depending on the geological formation, they may present from a smooth and structured to a rough and highly non-structured terrain. Furthermore, a single cave commonly has different kinds of terrain, what composes a heterogeneous topography with different requirements for optimal terrain transposing.

Considering that, the present invention consists on a single robotic device whose locomotion characteristics can be easily and quickly modified according to each kind of terrain presented in the cave. An operating assist module analyzes the terrain's topography, and based on that evaluate the tipping-over risk areas, suggesting possible locomotion configurations to transpose obstacles along the terrain. Each component and module present in this invention is explained below.

Robotic Device's Construction

Figure 1:
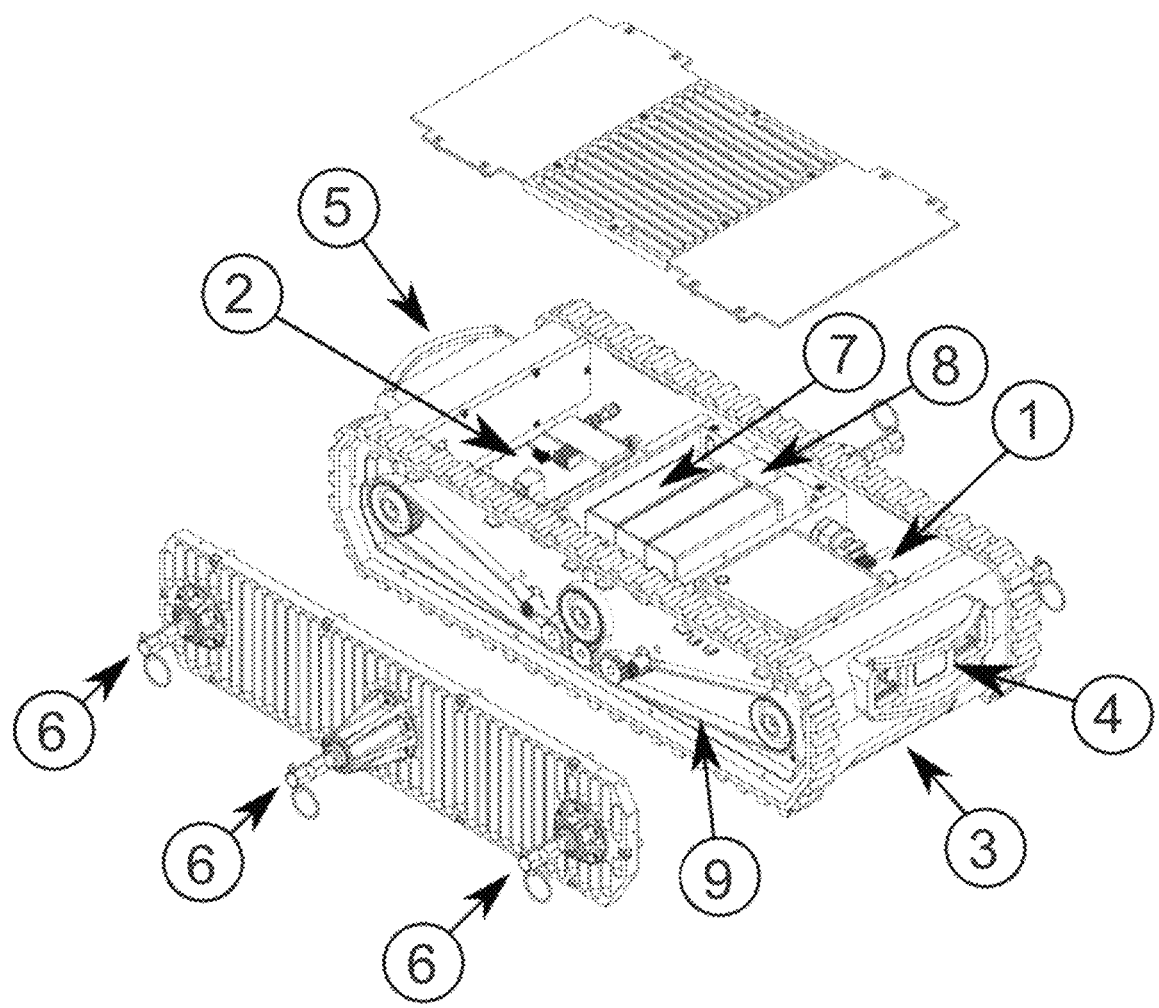
FIG. 1. Orthogonal view of the exploded robotic device frame.
Figure 2:
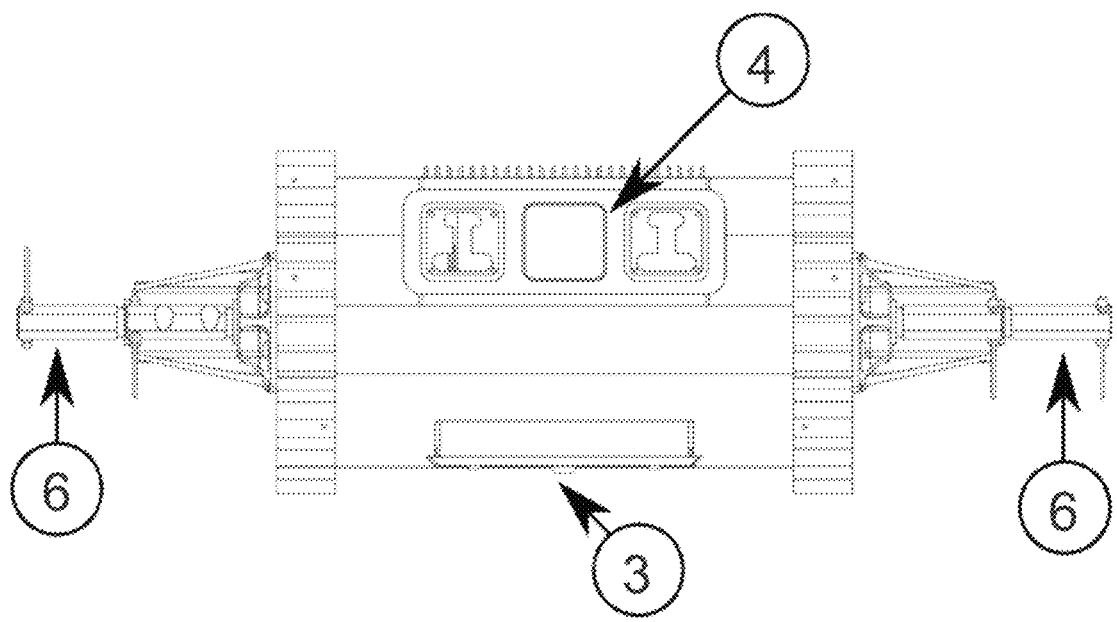
FIG. 2. Front view of the robotic device frame.
Figure 3:
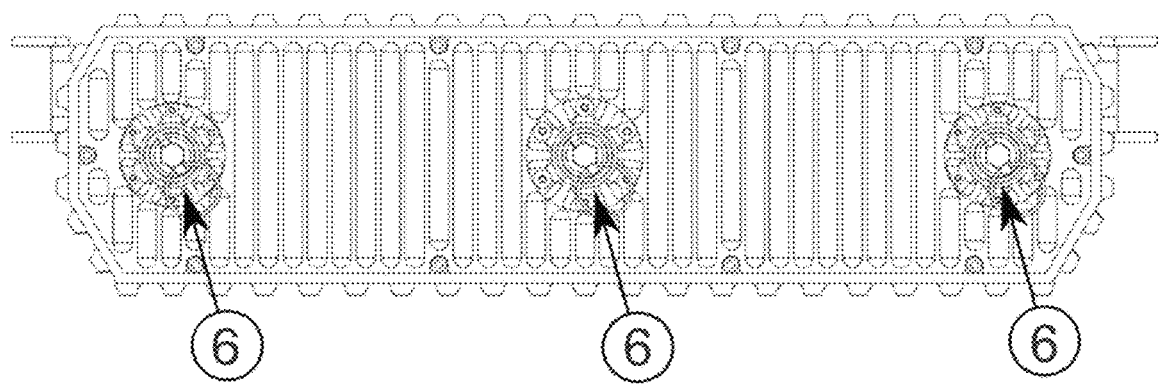
FIG. 3. Side view of the robotic device frame.

The robot frame has a rectangular body shape, as can be seen in FIG. 1, FIG. 2 and FIG. 3. The robot carries a core computer 1, a wireless communication module 2 and two batteries 3. There is also a set of cameras and illumination modules located on the front 4 and back 5 of the robot. The illumination modules are composed of a white light bright led and infrared lights. The cameras are full HD with wide-angle lens.

The locomotion mechanisms actuation uses six rotational joints, being three on each side of the body. Each joint axle 6 is actuated by a DC motor 7, possessing a total of six independently motors that can be controlled in position, velocity or torque modes. Each motor is coupled to the axle by a planetary gear 8 and a drive belt 9.

Quick Reconfigurable Locomotion Module

Figure 4:
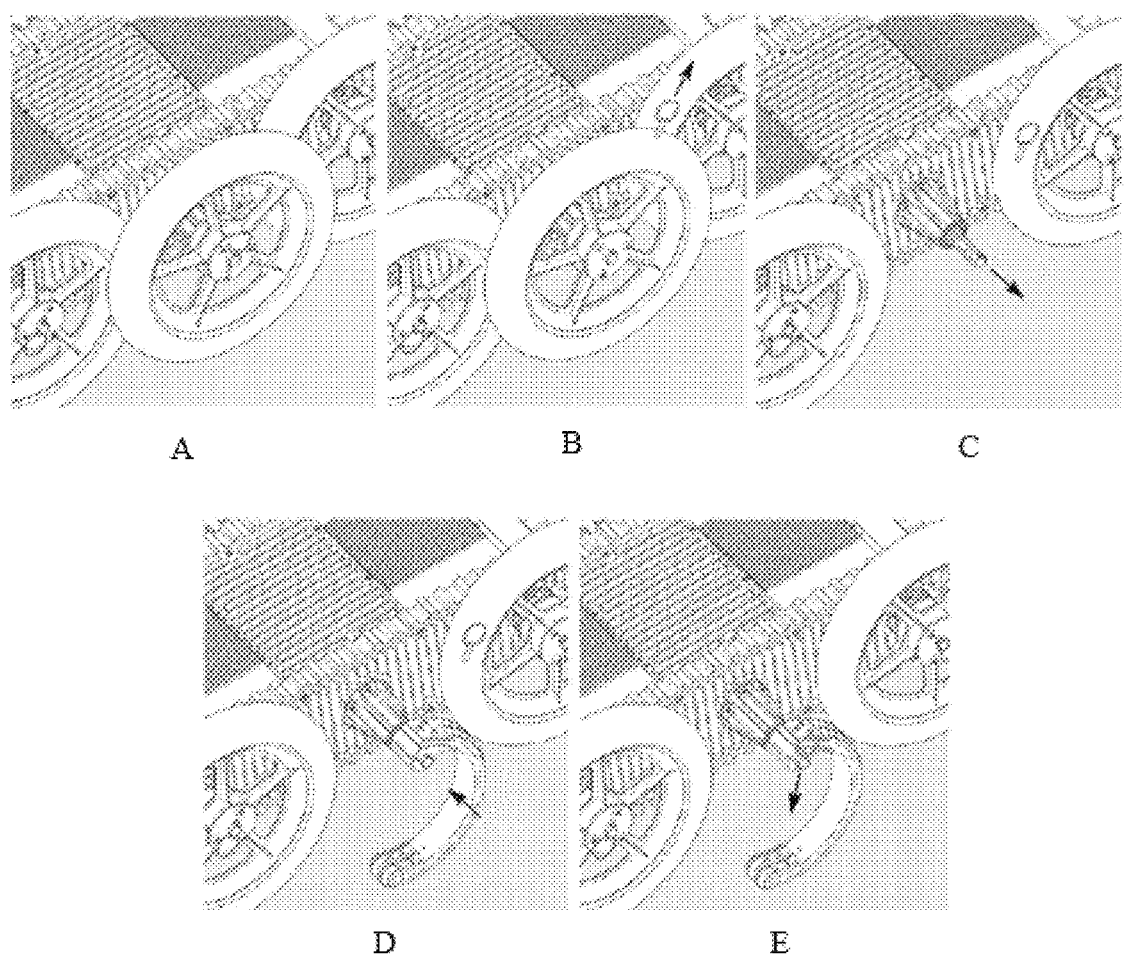
FIGS. 4(A) to (E). Sequence of steps to quickly change the locomotion mechanism.

The proposed robotic device has different locomotion mechanisms that can be quickly replaced. It allows the same device to have different locomotion characteristics and capabilities. FIG. 4 demonstrates how this module works. It is based on a quick release/attach pin to change the locomotion mechanism. The first box shows the locomotion mechanism attached to the joint axle by the pin (FIG. 4.A). To change a specific mechanism, it is necessary to release the pin (FIG. 4.B), release the locomotion mechanism (FIG. 4.C), insert in the axle the desired locomotion mechanism (FIG. 4.D) and finally attach the pin (FIG. 4.E).

This module dispenses the use of any additional tool. This is highly desirable as natural caves are commonly found on difficult access regions, and all the hardware must be carried by the operators; considering this, the less weight is necessary to be carried, the better.

Figure 5:
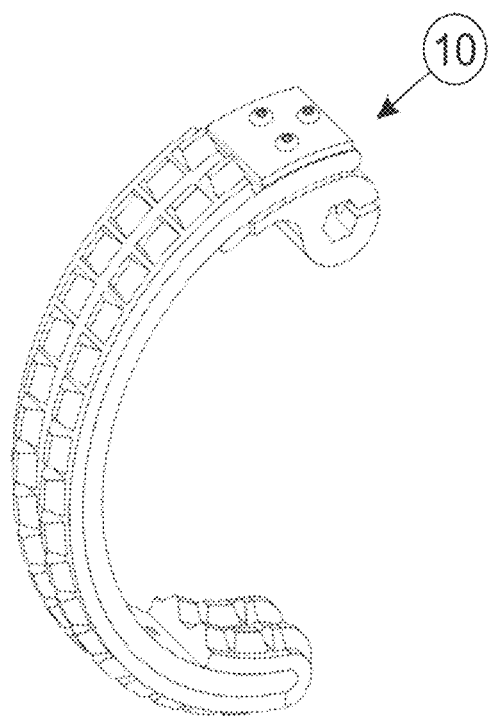
FIG. 5. Detailed view of the arc-shaped leg locomotion mechanism.
Figure 6:
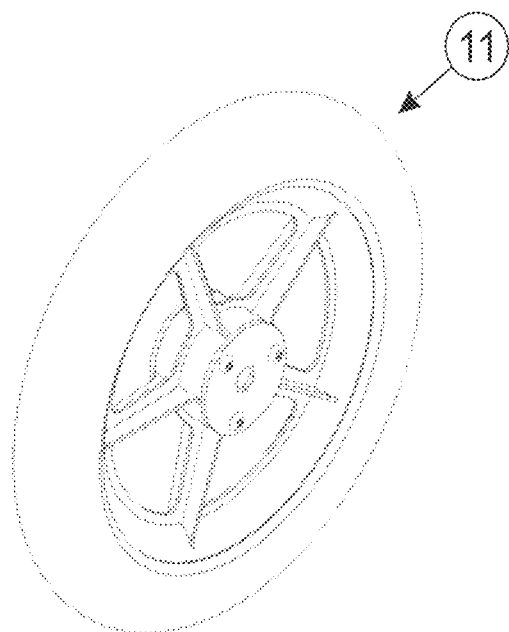
FIG. 6. Detailed view of the common wheel locomotion mechanism.
Figure 7:
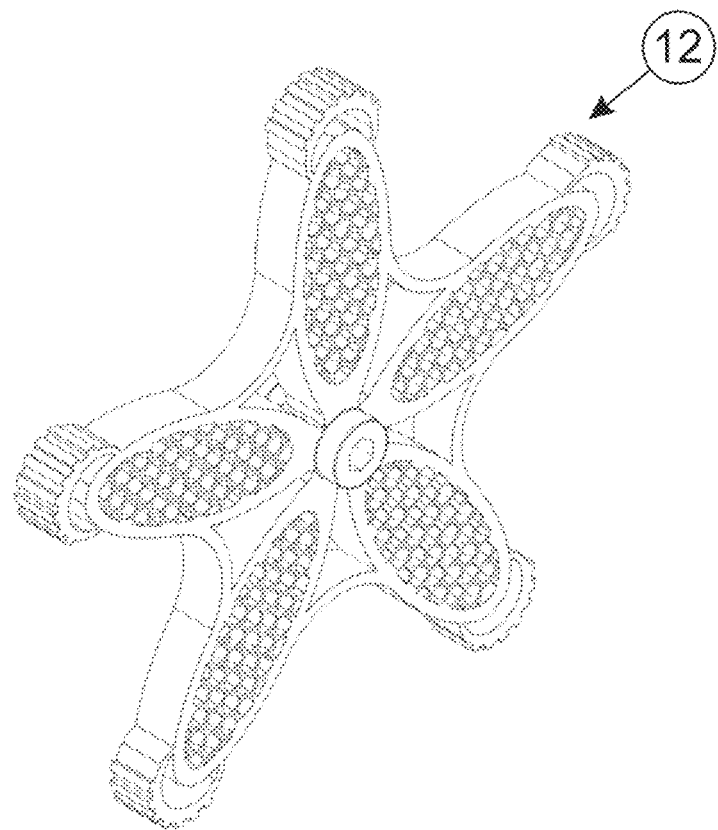
FIG. 7. Detailed view of the star-shaped wheel locomotion mechanism.
Figure 8:
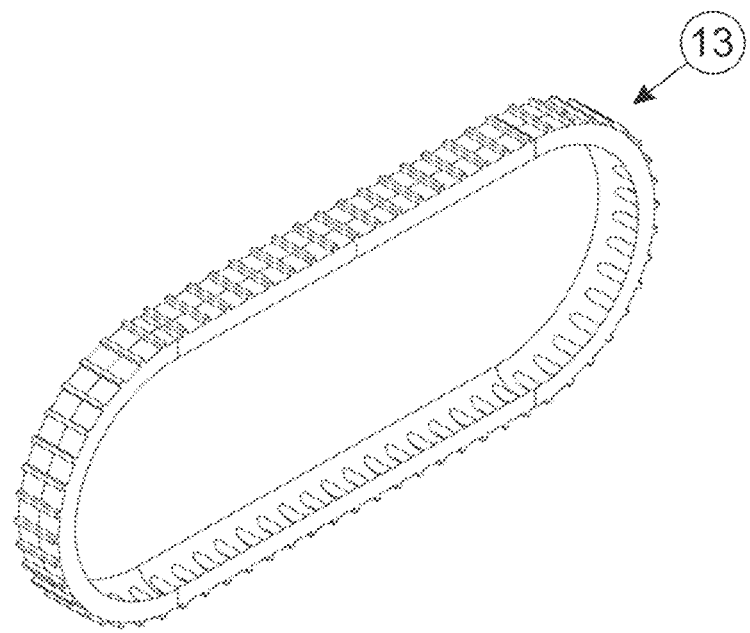
FIG. 8. Detailed view of the steer track locomotion mechanism.
Figure 9:
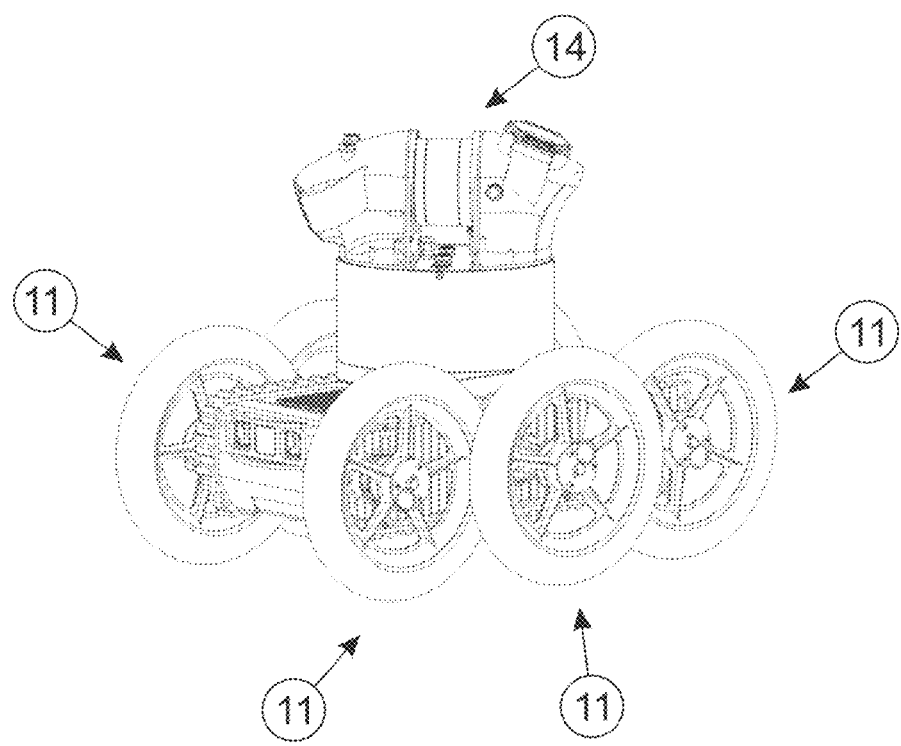
FIG. 9. Six common wheels locomotion configuration.
Figure 10:
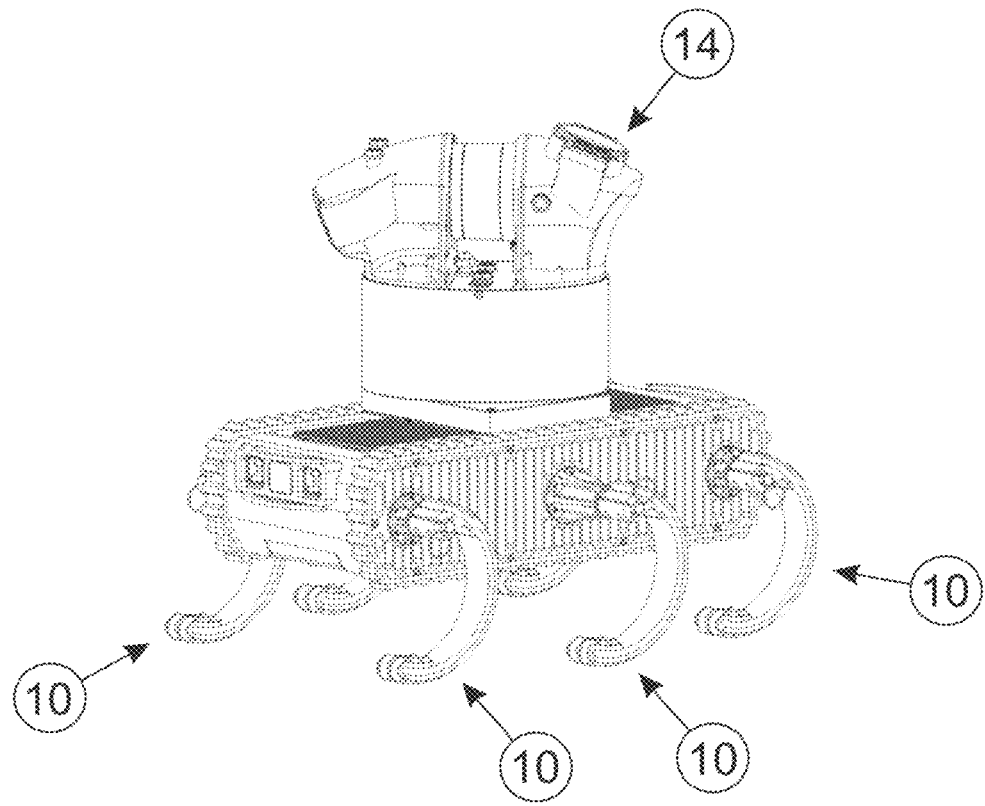
FIG. 10. Six arc-shaped legs locomotion configuration.
Figure 11:
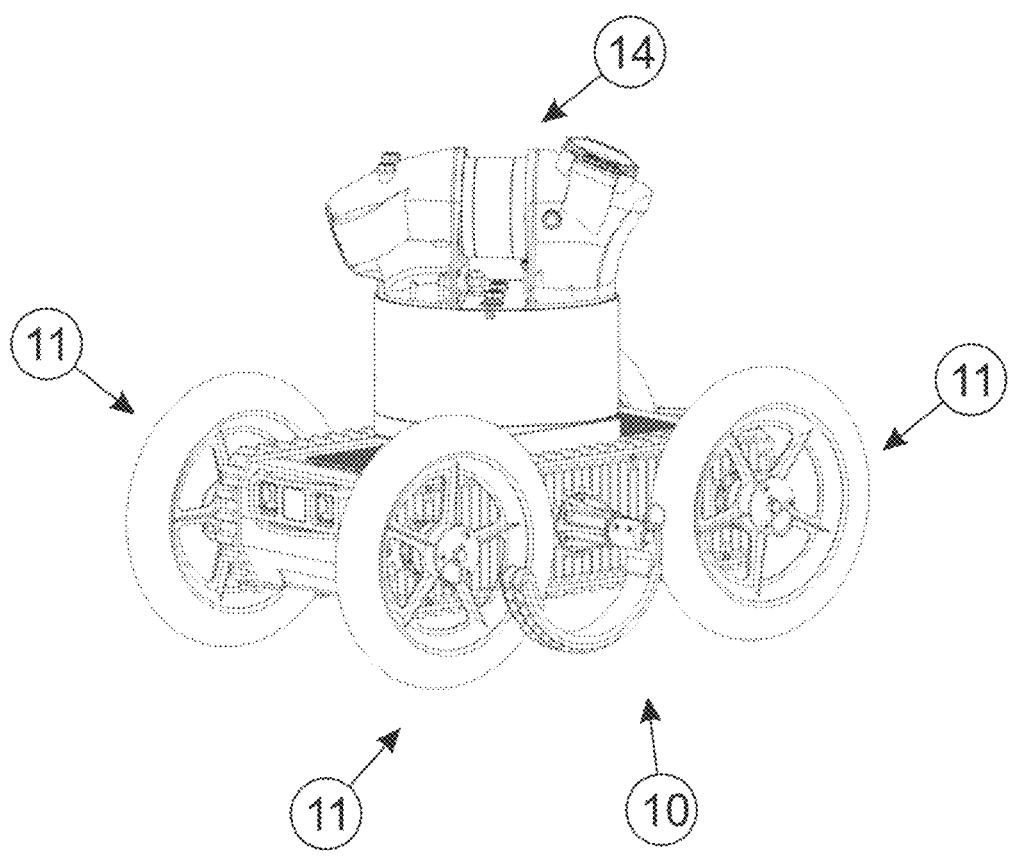
FIG. 11. Four common wheels and two arc-shaped legs locomotion configuration.
Figure 12:
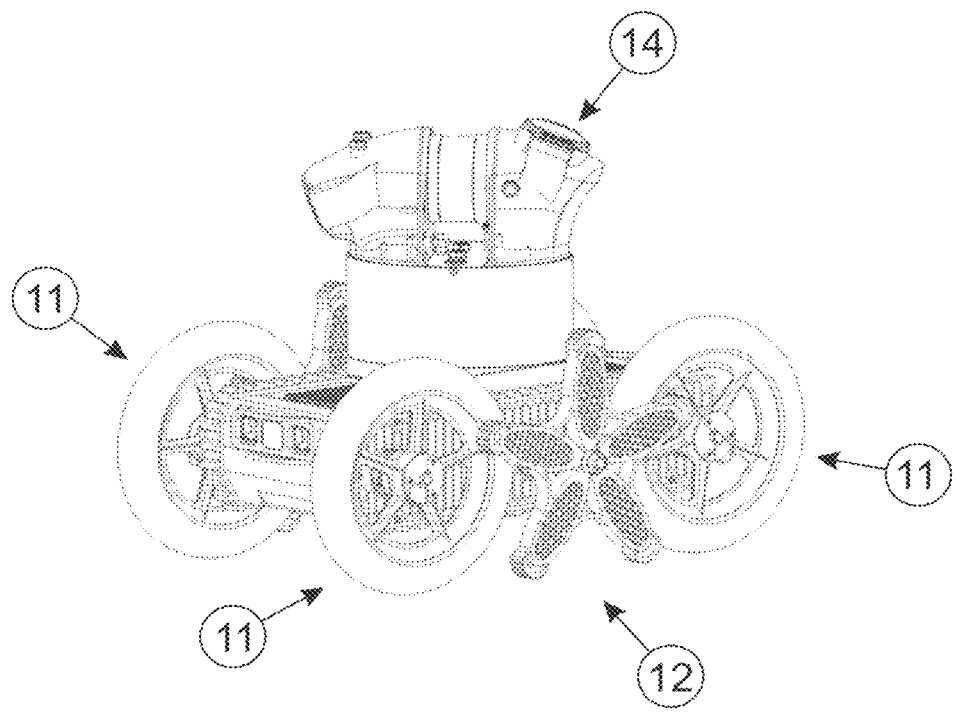
FIG. 12. Four common wheels and two star-shaped wheels locomotion configuration.
Figure 13:
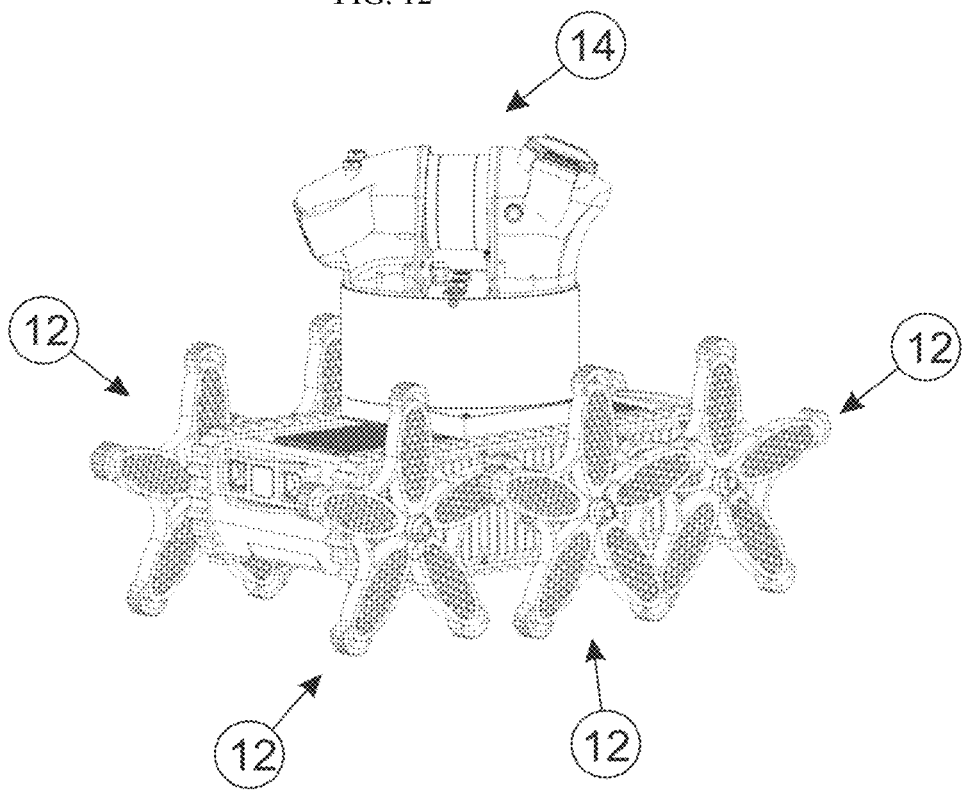
FIG. 13. Six star-shaped wheels locomotion configuration.
Figure 14:
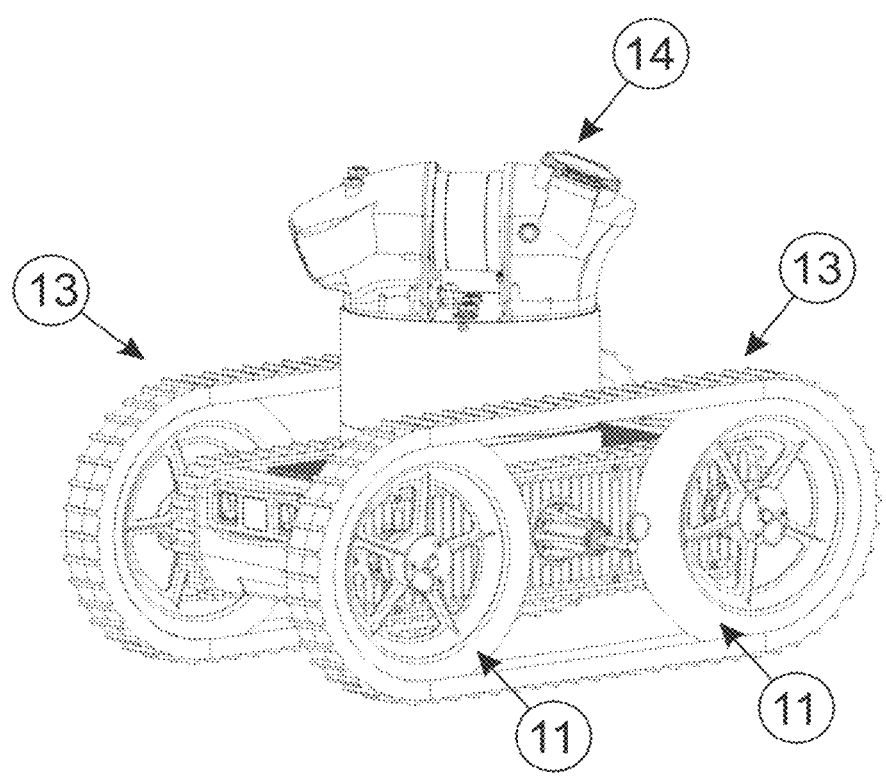
FIG. 14. Four common wheels with steer tracks locomotion configuration.

The locomotion mechanisms proposed this invention are: arc-shaped legs 10 (FIG. 5), common wheels 11 (FIG. 6), star-shaped wheels 12 (FIG. 7) and steer track 13 (FIG. 8). The assembly configuration pattern can be homogeneous, using only one kind of locomotion mechanism, or hybrid, using different types together. The assembly pattern can be configured, but not limited to, as: six (6) common wheels 11 (FIG. 9); six (6) arc-shaped legs 10 (FIG. 10); four (4) common wheels 11 on the corners and two (2) central legs 10 (FIG. 11); four (4) common wheels 11 on the corners and two (2) central star-shaped wheels 12 (FIG. 12); six (6) star-shaped wheels 12 (FIG. 13); four (4) wheels 11 on the corners with the steer tracks 13 coupled on (FIG. 14).

Exceptionally, the steer tracks are not attachable directly on the joint axle; instead, they are coupled to two common wheels. In this case, any available locomotion mechanism can be attached to the central axles in order to help on the locomotion.

The assembly pattern is referred in this document as "locomotion configuration"; consequently, each configuration is a combination of locomotion mechanisms. Each locomotion configuration has its own advantages and limitations. As an example, configurations based on common wheels consume less energy but are less efficient for obstacle transposition. When using legs, the characteristics are most opposite, enabling the device to move over rougher terrains but consuming more energy. In comparison with common wheels and legs, star-shaped wheels present intermediate performance. Steer tracks are most indicated for muddy terrain and present power consumption greater than wheels. In short, each locomotion configuration is indicated for a different kind of terrain, and the decision of which one should be used in the mission is fundamental to optimize the robot's traveled distance, stability and energy consumption.

Mapping Unit

Figure 15:
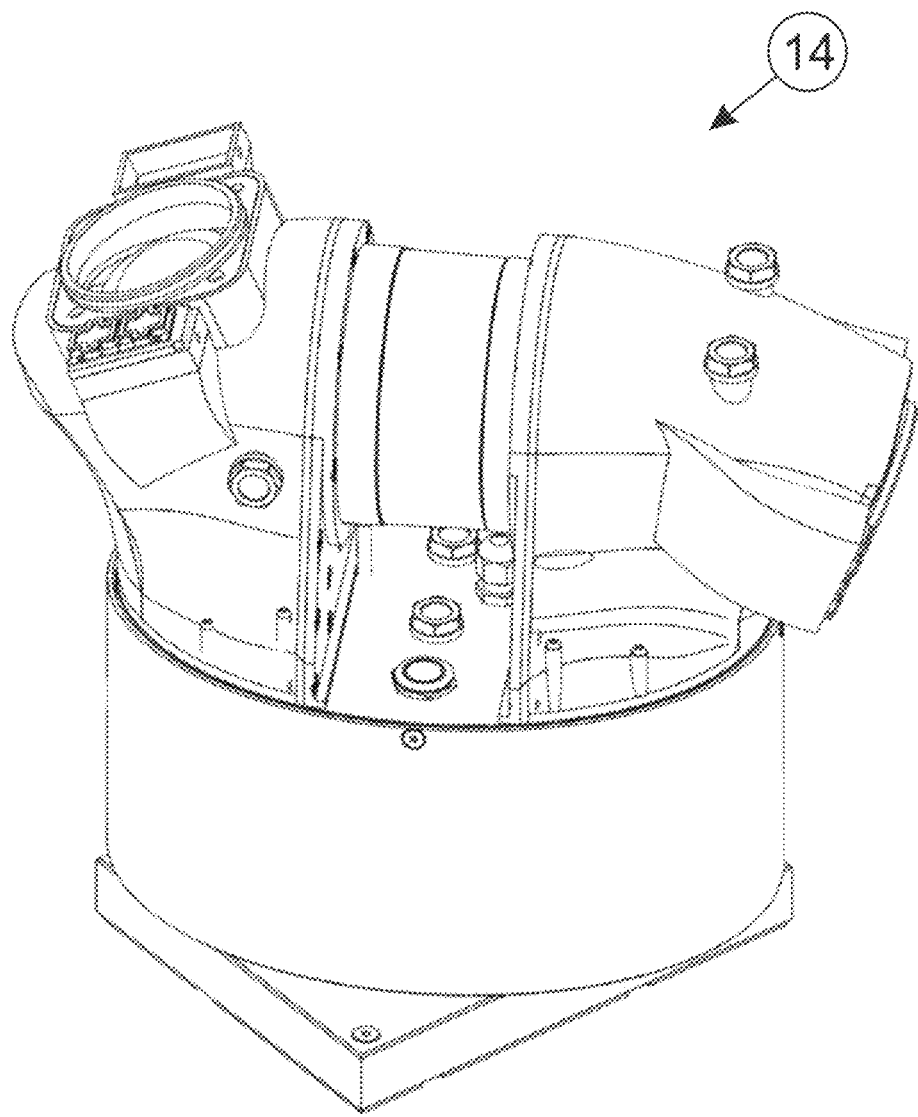
FIG. 15. Detailed view of the mapping unit.
Figure 16:
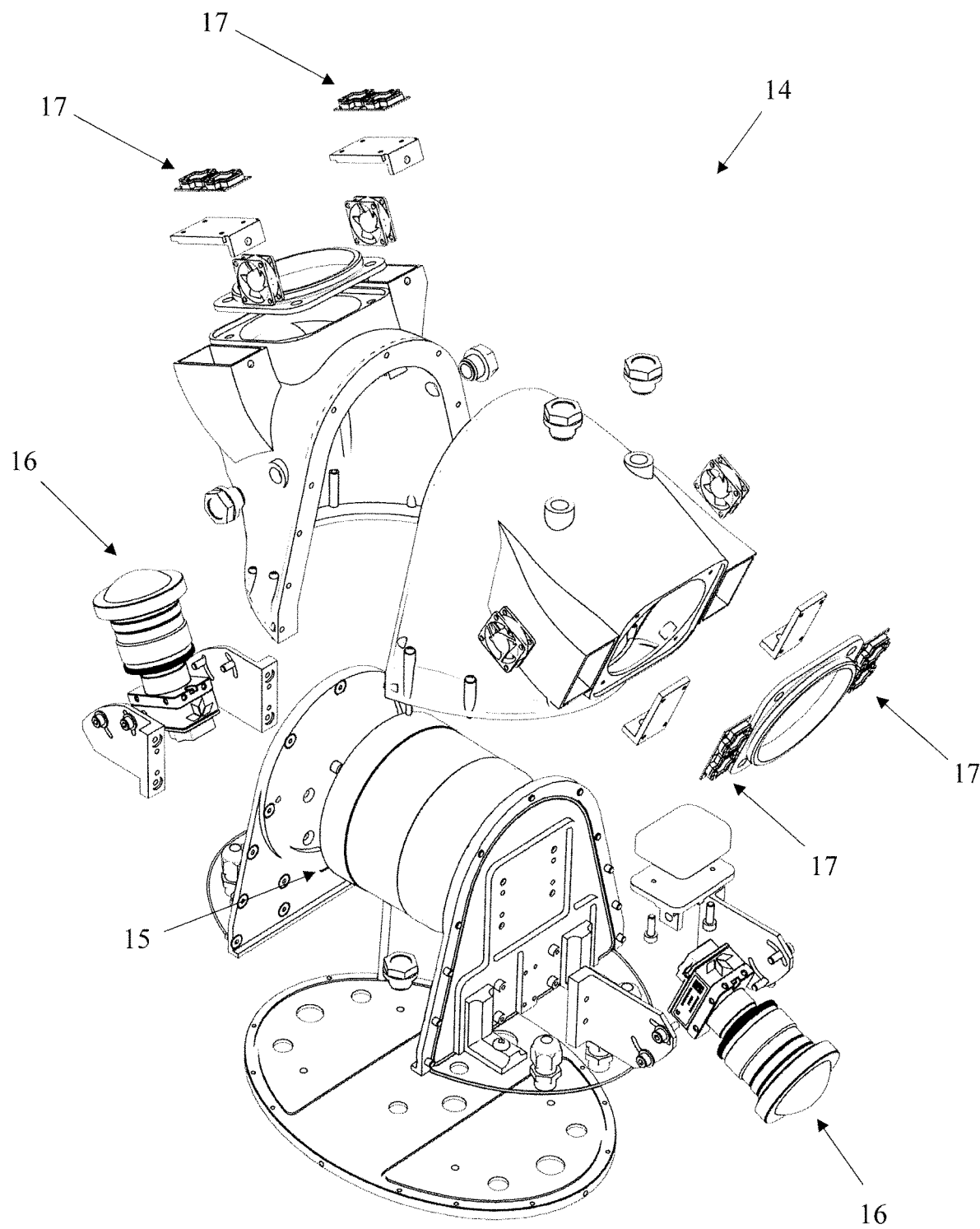
FIG. 16. Exploded view of the mapping unit's tip.

The mapping unit 14 is illustrated in FIG. 15 and the exploded view of its tip can be seen in FIG. 16. It is installed at the top of the robot to generate three dimensional (3D) colored point cloud datasets representing the surrounding environment, combining 3D geometric data and colored high-resolution images from cave walls. Using a direct current (DC) servomotor, the mapping unit rotates 360° continuously around the robot collecting and managing data from sensors. For that, the mapping unit is composed by an ultra-compact computer unit and sensors including a laser scanner—light imaging, detection, and ranging (LiDAR) 15, red-green-blue (RGB) cameras with large field-of-views lenses 16, high brightness light emitting diode (LED) external illuminators 17 and an Inertial Measurement Unit (IMU). All components are water and dust proof with IP Code from 54 to 67. Alternatively, all the components can be installed inside the robot or the mapping unit chassis, which are fully protected against external influences.

Figure 17:
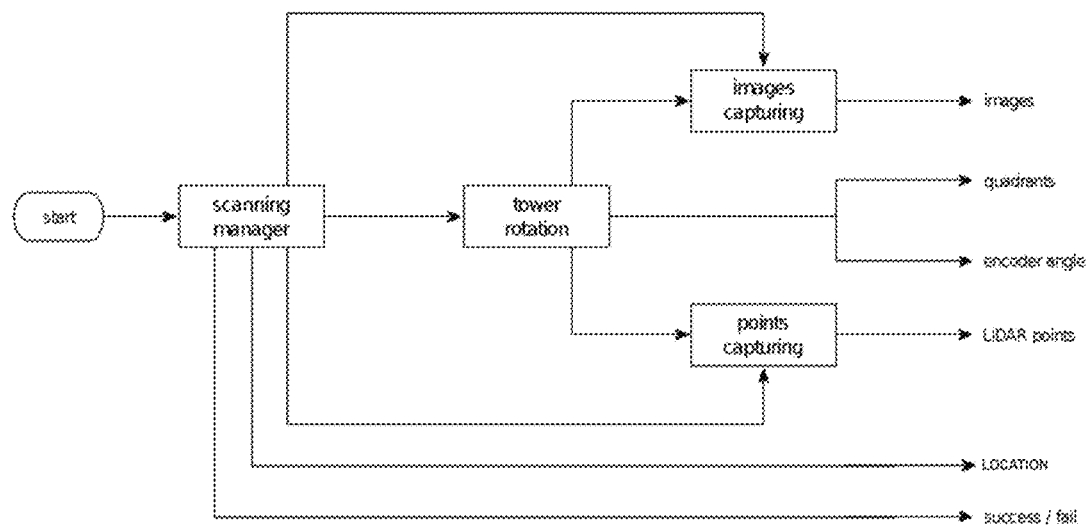
FIG. 17. Mapping unit operational workflow.

For software development purposes, the mapping process is divided into sub-functionalities: scanning manager, unit rotation, images capturing and points capturing (FIG. 17).

Scanning Manager

The scanning manager is responsible for coordinating the process of data collection performed by the LiDAR. After sending a command through the command interface, a state machine execution starts. The first action of the state machine is to check the status of the battery, to evaluate the feasibility of running the shot. Later, the state machine sends a command to connect the LiDAR, the two cameras, the 4 LEDs and the DC servomotor. The execution identifies a zero point of the rotation as the initial reference for the shot. Subsequently, LiDAR point storage starts. The images capturing are done at 08 (eight) rotation points (mapping unit angles: 0°, 45°, 90°, 135°, 180°, 225°, 270°, 315°, 360°). In case of failure, an alert message is displayed, and the user decides when to restart the scanning manager. The user can also stop the scanning at any stage. In the event of successful completion, the components are shut off and the mapping unit is repositioned.

The proposed system can map the environment in different operation conditions, including the robot stopped or moving. In order to attenuate the vibrations caused during the mapping while the robot is moving, the mapping unit may be connected to the robotic device by suspensions made of springs and/or airbags.

Mapping Unit Rotation

The mapping unit shall rotate about a vertically disposed axis using straight gears transmission and a DC servomotor. A 360° turn of the mapping unit consists of 4 full turns of the DC servomotor; due to the presence of gears, each complete rotation of the DC servomotor represents a 90° turn of the unit. The DC servomotor encoder indicates the end of the mapping unit rotation after the end of the 4th turn, consequently finishing the data acquisition. For the image storage step, this functionality should send the encoder angle of the DC servomotor and the quadrant at the time of capture.

Images Capturing

For image capture, two cameras are positioned according to FIG. 16, being possible to adjust their positioning. After starting a shot, the images are captured from both cameras simultaneously. This data is stored during the execution of the shot.

3D Points Capturing

A LiDAR provides 3D geometric data to generate a surface of points with their respective depths. It will return the points coordinates (X, Y, Z) referring to the coordinate system of the LiDAR. This handle data compiles a file called a point cloud, which is generated at the end of the shot. After this step, calibration is executed to correlate the point cloud with the photos taken by the HD cameras. For each 3D point, a pixel with the corresponding color of the photo collected during shot execution is related, so that a colored 3D point cloud is generated.

Figure 18:
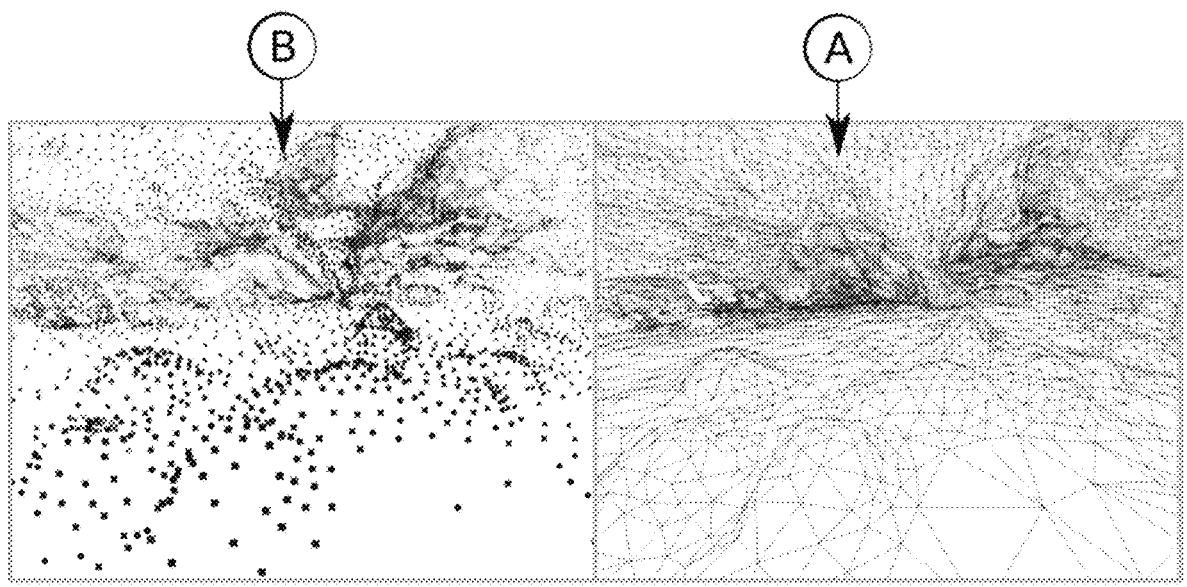
FIG. 18. A point cloud and generated mesh.

It is possible to generate a 3D mesh from a point cloud. A 3D mesh is a collection of planes, being triangular in the case of the present invention, which represents a three-dimensional shape. Therefore, the 3D mesh (FIG. 18.A) obtained from the point cloud (FIG. 18.B) represents the topography of the robot surroundings.

Operating Assist Module

Figure 19:
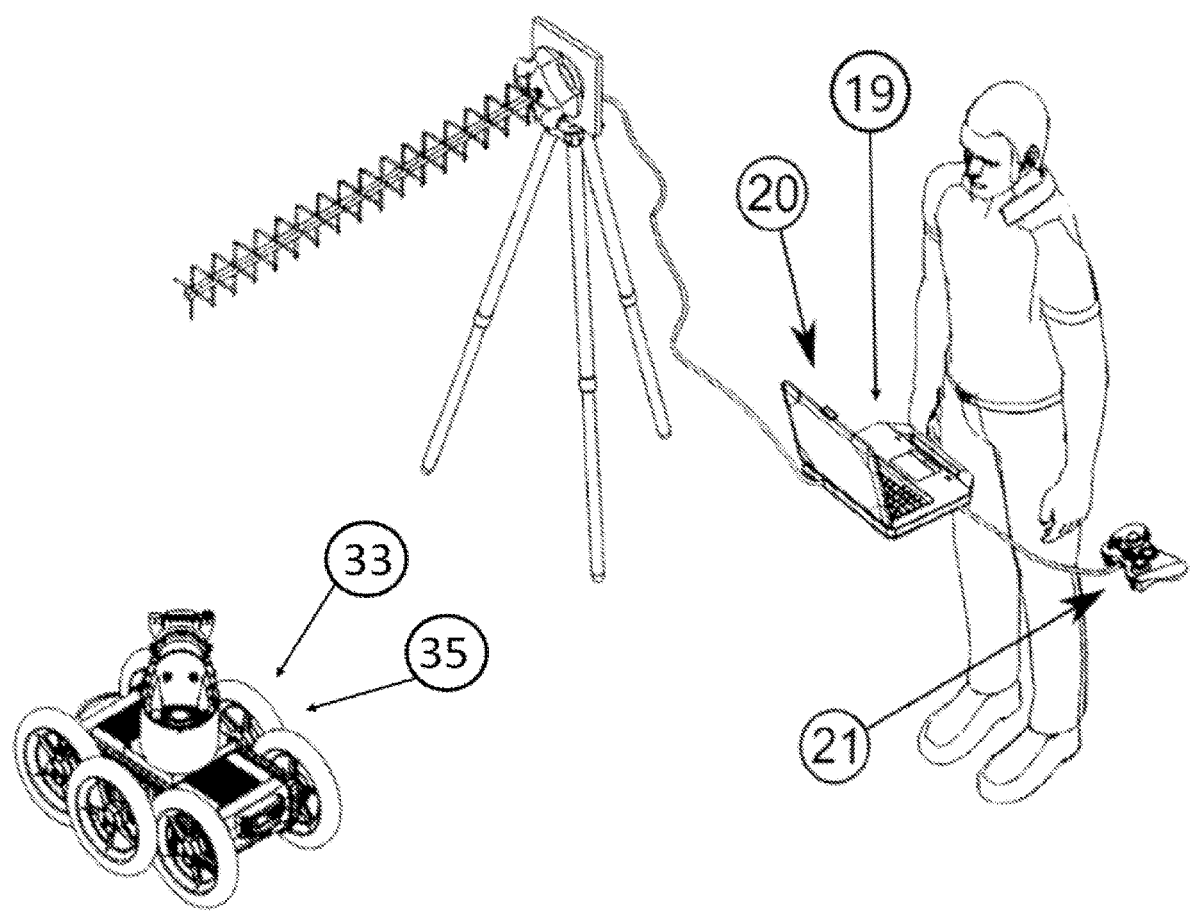
FIG. 19. Device's teleoperation scheme.
Figure 20:
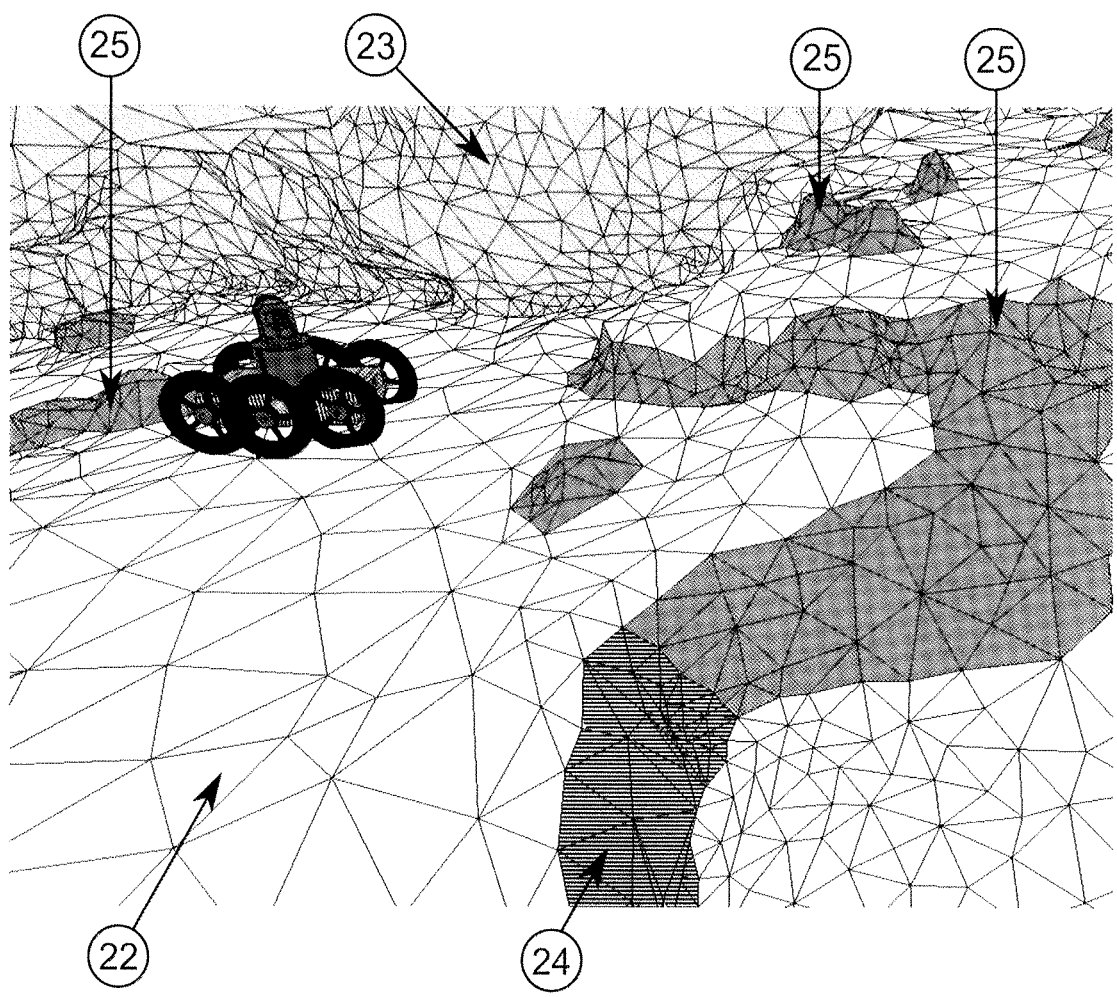
FIG. 20. Topographic map from the cave showing the transposable areas by the actual locomotion configuration, transposable areas by another locomotion configuration and tipping-over risk areas.

Referring to FIGS. 19 and 20, tele-operating an inspection robot is generally related to providing the operator a tele-operating computer 19 (FIG. 19) having a command interface where is possible to send commands to the device, and receive camera and other sensors feedback in order to visualize the robot surrounding environment. In the case of the present invention, the images provided by the two embedded cameras are shown to the operator at the user interface 20, and a joystick 21 is used to send commands to the robot.

A major disadvantage on teleoperation, when compared to local operation, is the loss of surroundings notion by the operator. Hereby, operating assist modules are desirable as they facilitate the mission execution and allow the operator to focus his attention on high-level tasks. The proposed operating assist module 33 helps the operator indicating areas where the robot may tip-over, and suggests adequate locomotion configurations capable to transpose each stretch of the terrain.

The operating assist module 33 uses as input the topographic map 22 of the robot surrounding environment disregarding cave's walls and ceiling 23. Based on that, the operating assist module 33 estimates the robot pose (position and orientation) and the stability, related to the risk of tipping-over, for each stretch of the known map. For that, different mobility metrics can be employed, including force-angle measure of tip-over stability margin proposed by Evangelos Papadopoulos and Daniel A. Rey, and energy stability margin proposed by Messuri and Klein. The robot stability prediction allows highlighting the tipping-over risk areas 24 of the map that should be avoided during all operation.

For the remaining map area, the topography is analyzed to identify regions that are transposable 22 by the locomotion configuration in use. Given the regions classified as non-transposable 25, other available locomotion mechanisms are evaluated to identify the adequate ones for transposing such obstacles. This evaluation is done through online or offline simulations, which analyze the robot mobility performance using all possible locomotion configurations while transposing similar obstacles. If none of the available locomotion mechanisms are able to overcome these regions, they should also be highlight in the map as areas to be avoided during operation.

The operating assist module 33 uses the information to generate a modified map of the terrain that explicitly indicates to the user the non-transposable or rollover risk areas that should be avoided, and obstacles where another locomotion mechanisms are more indicated for transposition.

Thus, the present invention also proposes a method for guiding the multi-terrain inspection robotic device. The robotic device is guided according to the following steps: obtaining an updated topographic map of the robot surroundings; estimating a robot pose over numerous map locations, considering all possible locomotion configurations; calculating stability metrics for all of those estimated poses; identifying areas in the map where the robot may tip-over with the locomotion mechanism in use, analyzing the metrics results obtained with other locomotion mechanism and identifying configurations that do not tip-over while transposing such obstacles; and generating a map with the transposable, tipping-over risk and non-transposable areas with the locomotion mechanism in use, also indicating other locomotion configurations to transpose the restricted areas.

Autonomous Navigation Module

The operation in autonomous mode is also available. This strategy differs from classical approaches as it takes into consideration the robot locomotion configuration to calculate its stability and obstacle transposition capabilities for an optimal path planning.

Before the mission begins, the operator indicates to the autonomous navigation module 35 which mobility metric should be optimized: shortest path, minimum tipping-over risk or minimum energy consumption. This information corresponds to specific gains that the operator sets, also allowing to establish a trade-off between the different mobility metrics.

Overcoming high obstacles normally means to take shortcuts and then perform faster inspections. However, covering rough terrains presents more risk for the robot to tip-over, and consumes more energy considering the extra power applied by the motors to transpose obstacles in the environment. That way, traveling through flatter terrains should be safer and energy consumption friendlier.

The autonomous navigation module 35 requires as input the updated topographic map from the surroundings. Using stability metrics and the information about the locomotion configuration in use, the module withdraws the tipping-over risk and non-transposable areas from the map; that way, the path planning will not consider risk areas.

Three paths to the target point are 0 the shortest, the safer according to the risk of tipping-over, and the energy saver. The choice of which one is going to be executed will depend on the mobility policy defined previously.

Figure 21:
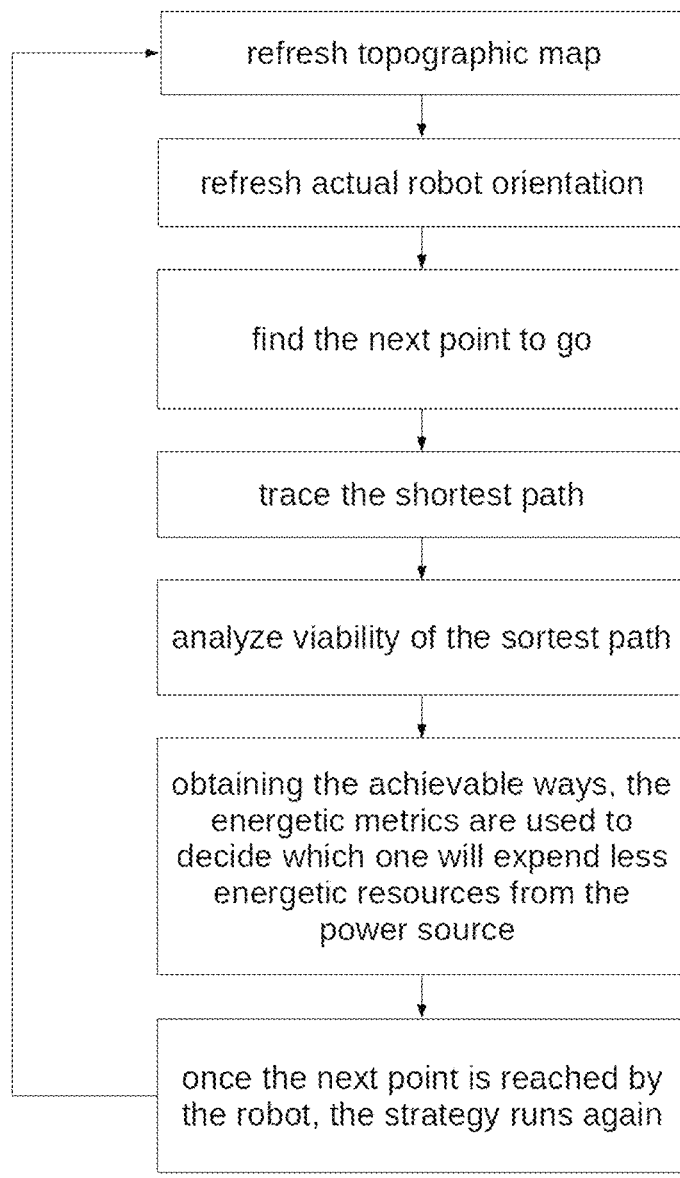
FIG. 21. Flowchart describing the autonomous navigation module operation.
Figure 22:
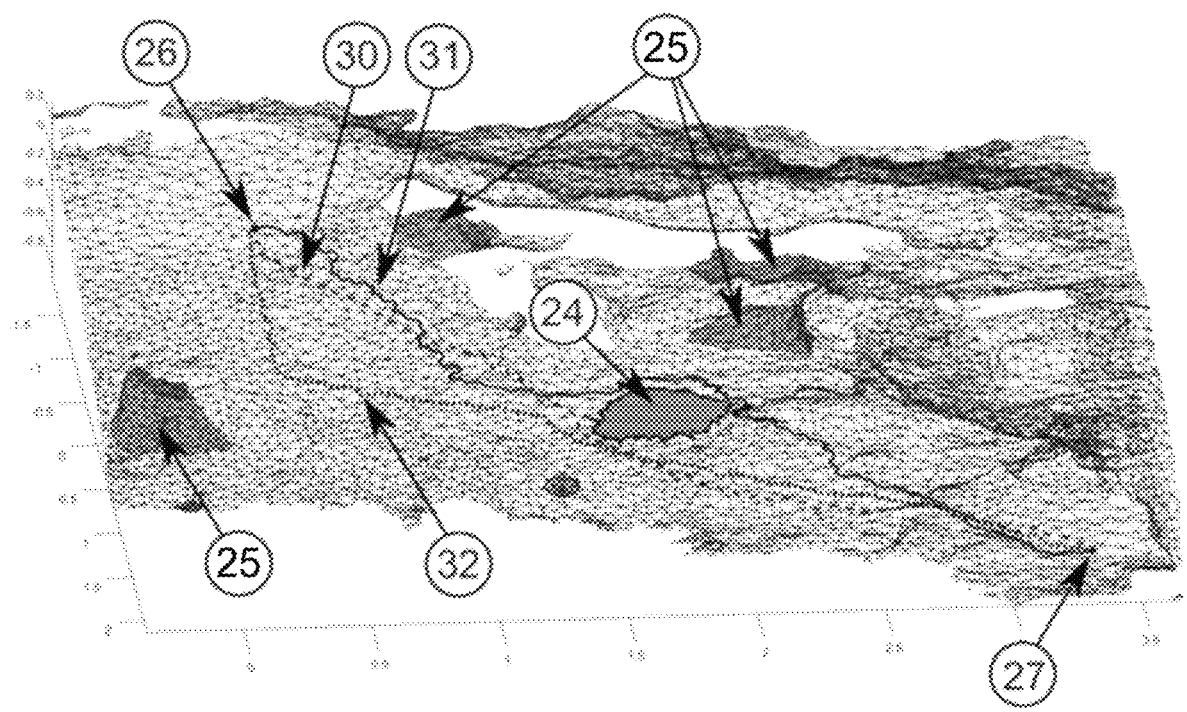
FIG. 22. Demonstration of a topographic map with different paths calculated based on mobility policy.

This strategy (FIG. 21) is implemented as follow: the robot is located in the start point 26 and should move the next goal point 27, which can be directly informed by the operator or obtained via exploring algorithms such as cellular decomposition for complete coverage path planning. The non-transposable obstacles 25 by the locomotion configuration in use and the tipping-over risk areas 24 are not considered by the path planning algorithm. The shortest 30, safest 31 and energy friendliest 32 paths are calculated; the executed path is defined according to the mobility policy defined previously.

After exploring all possible regions transposable by the actual locomotion configuration, the robot returns to the base and indicates to the operator an alternative locomotion mechanism capable to access the non-inspected areas. Using the recommended locomotion configuration, the robot is able to re-enter the mission area, going directly to the non-covered areas in order to complete the 3D map of the inspected environment.

Thus, the present invention further provides a method for guiding the multi-terrain inspection robotic device. The robotic device is guided according to the following steps: obtaining an updated topographic map of the robot surroundings; obtaining gain values representing the mobility policy, which indicates which metric to optimize: shortest path, minimum tipping-over risk or minimum energy consumption; obtaining a robotic device's next goal point, which can be directly informed or obtained via exploring algorithms such as cellular decomposition for complete coverage path planning to inspect the entire environment; removing from the topographic map areas with tipping-over risk and non-transposable areas by the locomotion mechanism in use; tracing, considering the modified map generated, the shortest path to the target point using path planning algorithms such as A* or D*; tracing, considering the modified map, the path with less tipping-over risk to the target point using path planning algorithms based on stability metrics, such as force-angle measure of tip-over stability margin or energy based stability margin; tracing, considering the modified map, the optimal energy consumption path to the target point using path planning algorithms based on the energy consumption of the robot motors; choosing which one of the obtained paths is going to be used depending on mobility policy defined for the autonomous navigation module; commanding the robotic device to reach the goal point.

While various example embodiments have been described above, it should be understood that they have been presented by way of example, and not limitation. It will be apparent to persons skilled in the relevant art(s) that various changes in form and detail can be made therein.

The invention claimed is:

1. A multi-terrain inspection robotic device, comprising:
a robot frame, comprising a plurality of cameras with an illumination system;
a mapping unit attached to the robot frame, comprising a plurality of sensors;
a reconfigurable locomotion module configured to receive a plurality of locomotion mechanisms arranged according to selectable assembly patterns; and
a computer configured to:
receive data from the plurality of sensors and the plurality of cameras associated with a topography of a terrain and configured to identify, based on the data, an adequate assembly pattern of the plurality of locomotion mechanisms capable of transposing a first set of one or more areas of the terrain associated with a first obstacle;
determine an optimal path planning for the multi-terrain inspection robotic device; and
indicate, based on the data, an alternative assembly pattern of the plurality of locomotion mechanisms capable of transposing a second set of one or more areas of the terrain associated with a second obstacle.

2. The multi-terrain inspection robotic device of claim 1, wherein the robot frame has a rectangular shape with six rotational joints, including three for each side.

3. The multi-terrain inspection robotic device of claim 2, wherein each joint has its own independent controllable motor.

4. The multi-terrain inspection robotic device of claim 1, wherein the plurality of locomotion mechanisms of the reconfigurable locomotion module are selected from a group comprising: common wheels; star-shaped wheels; arc-shaped legs; or steer tracks.

5. The multi-terrain inspection robotic device of claim 4, wherein the plurality of locomotion mechanisms of the reconfigurable locomotion module are promptly and unitarily replaced using a quick release pin.

6. The multi-terrain inspection robotic device of claim 4, wherein the reconfigurable locomotion module enables the assembly pattern of the plurality of locomotion mechanisms to be homogeneous, using only one type of locomotion mechanism of the plurality of locomotion mechanisms, or heterogeneous, using different types of the plurality of locomotion mechanisms together.

7. The multi-terrain inspection robotic device of claim 1, wherein the plurality of sensors of the mapping unit comprises: a three dimensional (3D) laser scanner, a full high definition (HD) color camera, a high brightness light emitting diode (LED) external illuminator, and an Inertial Measurement Unit.

8. The multi-terrain inspection robotic device of claim 1, wherein the mapping unit includes a laser scanner in a vertical position and 360° rotational mechanism, which enables the laser scanner to scan surroundings of the multi-terrain inspection robotic device.

9. The multi-terrain inspection robotic device of claim 7, wherein the plurality of sensors of the mapping unit are configured to provide raw data, wherein the raw data includes 3D point cloud data and colored image data.

10. The multi-terrain inspection robotic device of claim 9, wherein the 3D point cloud data and the colored image data are fused to generate a colored 3D point cloud of an inspected area.

11. The multi-terrain inspection robotic device of claim 9, wherein the 3D point cloud data is used to generate a 3D mesh of an inspected area, wherein the 3D mesh defines a topographic map of surroundings of the multi-terrain inspection robotic device.

12. The multi-terrain inspection robotic device of claim 1, wherein the multi-terrain inspection robotic device is specifically designed for operating in mining activities.

13. The multi-terrain inspection robotic device of claim 1, wherein the multi-terrain inspection robotic device is specifically designed for operating in speleology activities.

14. The multi-terrain inspection robotic device of claim 1, wherein the multi-terrain inspection robotic device is specifically designed for cave inspections in speleology activities.

15. The multi-terrain inspection robotic device of claim 1, wherein the multi-terrain inspection robotic device is specifically designed for operating in confined areas.

16. The multi-terrain inspection robotic device of claim 1, wherein the multi-terrain inspection robotic device is specifically designed for operating in sewer and dam spillway galleries.

17. The multi-terrain inspection robotic device of claim 1, wherein the multi-terrain inspection robotic device is specifically designed for operating in areas with risk of collapse.

18. A method for guiding the multi-terrain inspection robotic device of claim 1, comprising:
obtaining an updated topographic map of surroundings of the multi-terrain inspection robotic device;
estimating a pose of the multi-terrain inspection robotic device over numerous map locations for each of the plurality of locomotion mechanisms;
calculating stability metrics for all of the estimated poses;
identifying areas in the updated topographic map for a locomotion mechanism in use of the plurality of locomotion mechanisms where a corresponding one of the stability metrics indicates that the multi-terrain inspection robotic device may tip-over with the locomotion mechanism in use, analyzing a corresponding one of the stability metrics of other ones of the plurality of locomotion mechanisms in the identified areas and identifying whether one or more of the other ones of the plurality of locomotion mechanisms do not tip-over while transposing the identified areas in order to define one or more transposable areas, tipping-over risk areas, or non-transposable areas; and
generating a map with the one or more ones of the transposable areas, the tipping-over risk areas, or the non-transposable areas with the locomotion mechanism in use, also indicating alternative ones from the other ones of the plurality of locomotion mechanisms identified as being able to transpose at least one of the tipping-over risk areas or the non-transposable areas.

19. The method of claim 18, further comprising determining a tipping-over risk estimation based on the stability metrics, the stability metrics being applied to the updated topographic map of the surroundings of the multi-terrain inspection robotic device, considering a geometry of the multi-terrain inspection robotic device according to the locomotion mechanism in use and the estimated poses and wherein the stability metrics include a force-angle measure of a tip-over stability margin and an energy stability margin.

20. A method for optimal path planning to guide the multi-terrain inspection robotic device of claim 1, comprising:
obtaining an updated topographic map of surroundings of the multi-terrain inspection robotic device;
obtaining gain values representing a mobility policy, which indicates which metric to optimize of at least one of: a shortest path, a minimum tipping-over risk, or a minimum energy consumption;
obtaining a target point, which is either directly informed or obtained via an exploring algorithm;
removing, from the updated topographic map, areas with a tipping-over risk and non-transposable areas by a locomotion mechanism in use to define a modified map;
tracing, considering the modified map, the shortest path to the target point using a path planning algorithm;
tracing, considering the modified map, a first path with less tipping-over risk to the target point as compared to the shortest path using a first path planning algorithm based on stability metrics, including force-angle measure of a tip-over stability margin or energy based stability margin;
tracing, considering the modified map, a second path associated with an optimal energy consumption to the target point using a second path planning algorithm based on energy consumption of motors of the multi-terrain robotic device;

choosing which one of the shortest path, the first path, or the second path is going to be used depending on the mobility policy; and commanding the multi-terrain inspection robotic device to reach the target point based on a chosen one of the shortest path, the first path, or the second path.

21. The multi-terrain inspection robotic device of claim 6, wherein, the assembly pattern is configured as one of: 6 common wheels; 6 star-shaped wheels; 6 arc-shaped legs; 4 common wheels on corners and 2 central legs; 4 common wheels on the corners and 2 central star-shaped wheels; or 4 common wheels on the corners with steer tracks coupled thereto.

22. The method of claim 20, wherein the exploring algorithm comprises a cellular decomposition for complete coverage path planning to inspect the entire environment.

* * * * *